US012655843B2

(12) United States Patent

Göpfert et al.

(10) Patent No.: US 12,655,843 B2

(45) Date of Patent: Jun. 16, 2026

---

(54) DRIVE UNIT FOR MOTOR DOSING PUMP

(71) Applicant: ProMinent GmbH, Heidelberg (DE)

(72) Inventors: Maximilian Göpfert, Mannheim (DE); Martin Reinhard, Heidelberg (DE)

(73) Assignee: ProMinent GmbH, Heidelberg (DE)

( * ) Notice: Subject to any disclaimer, the term of this patent is extended or adjusted under 35 U.S.C. 154(b) by 216 days.

(21) Appl. No.: 18/352,609

(22) Filed: Jul. 14, 2023

(65) Prior Publication Data

US 2024/0018959 A1 Jan. 18, 2024

(30) Foreign Application Priority Data

Jul. 18, 2022 (DE) .......................... 102022117831.5

(51) Int. Cl.
| | |
|---|---|
| *F04B 53/18* | (2006.01) |
| *F16H 57/04* | (2010.01) |
| *G01F 3/24* | (2006.01) |

(52) U.S. Cl.
CPC ........... *F04B 53/18* (2013.01); *F16H 57/043* (2013.01); *G01F 3/24* (2013.01)

(58) Field of Classification Search
None
See application file for complete search history.

(56) References Cited

U.S. PATENT DOCUMENTS

| | | | | | |
|---|---|---|---|---|---|
| 1,652,642 | A | * | 12/1927 | Shaw ......................... | F16N 7/36 |
| | | | | | 384/378 |
| 2,030,611 | A | * | 2/1936 | Schmidt ................... | F16N 7/366 |
| | | | | | 417/372 |
| 2,500,751 | A | * | 3/1950 | Halfvarson ............. | F25B 31/02 |
| | | | | | 417/372 |
| 2,768,863 | A | * | 10/1956 | Morrill ..................... | F16N 7/36 |
| | | | | | 384/412 |
| 3,084,648 | A | * | 4/1963 | Ketterer ................. | D05B 71/02 |
| | | | | | 184/6.15 |

(Continued)

FOREIGN PATENT DOCUMENTS

| | | |
|---|---|---|
| CN | 201016366 Y | 2/2008 |
| CN | 210398338 U | 4/2020 |

(Continued)

OTHER PUBLICATIONS

Examination Report issued on Jan. 27, 2023 of corresponding German application No. 10 2022 117 831.5; 11 pages.

*Primary Examiner* — Dominick L Plakkoottam
*Assistant Examiner* — Geoffrey S Lee
(74) *Attorney, Agent, or Firm* — Maier & Maier, PLLC

(57) ABSTRACT

A drive unit for a motor metering pump and a metering pump, including a drive chamber and a drive shaft arranged in the drive chamber. The drive shaft is rotated about a longitudinal axis in a direction of rotation during operation of the drive unit, the drive unit includes a bearing in which the drive shaft is mounted. The drive chamber is filled with a lubricant up to a filling level during operation of the drive unit, and the bearing is arranged above the filling level in the direction of the longitudinal axis. The drive shaft has a conveying channel for the lubricant, which extends from a first point below the filling level to a second point above the filling level and is arranged in such a way that, during operation of the drive unit, lubricant is transported from the first point to the second point.

18 Claims, 4 Drawing Sheets

(56)            References Cited

U.S. PATENT DOCUMENTS

| | | | | | |
|---|---|---|---|---|---|
| 4,091,638 | A | * | 5/1978 | Mitch | F04C 29/04<br>62/470 |
| 4,850,819 | A | * | 7/1989 | Bush | F04C 29/028<br>184/6.18 |
| 5,842,420 | A | * | 12/1998 | Khoo | F16N 7/366<br>418/94 |
| 7,632,082 | B2 | * | 12/2009 | Ogasawara | F04C 23/008<br>418/94 |
| 8,435,016 | B2 | | 5/2013 | Telakowski et al. | |
| 8,739,933 | B2 | * | 6/2014 | Wagner | F16N 7/366<br>184/26 |
| 11,242,846 | B2 | * | 2/2022 | Kim | F04B 39/0094 |
| 2003/0010573 | A1 | * | 1/2003 | Kueon | F04B 39/0253<br>184/6.16 |
| 2005/0115771 | A1 | * | 6/2005 | Shin | F04B 39/023<br>184/6.16 |
| 2006/0222551 | A1 | | 10/2006 | Jung et al. | |
| 2007/0081908 | A1 | * | 4/2007 | Nishihara | F04B 39/0261<br>417/415 |

FOREIGN PATENT DOCUMENTS

| | | | | | |
|---|---|---|---|---|---|
| DE | 1628154 | A1 | 12/1971 | | |
| DE | 19510015 | A1 | 9/1996 | | |
| DE | 69311036 | T2 | 9/1997 | | |
| JP | S58-174179 | A | 10/1983 | | |
| WO | WO-9322557 | A1 | * 11/1993 | | F04B 39/0261 |
| WO | 2016/119869 | A1 | 8/2016 | | |

* cited by examiner

DRIVE UNIT FOR MOTOR DOSING PUMP

FIELD

The present invention relates to a drive unit for a motor metering pump, comprising a drive chamber and a drive shaft arranged in the drive chamber, wherein the drive shaft is rotated in a direction of rotation about a longitudinal axis during operation of the drive unit, wherein the drive unit comprises a bearing in which the drive shaft is mounted, wherein the drive chamber is filled with a lubricant up to a filling level during operation of the drive unit, wherein the bearing is arranged above the filling level in the direction of the longitudinal axis, wherein the drive shaft comprises a conveying channel for the lubricant which extends from a first point below the filling level to a second point above the filling level and is arranged such that, during operation of the drive unit, lubricant is transported from the first point to the second point.

In the following, the longitudinal axis defines an axial direction, a radial direction and a circumferential direction. The axial direction is understood to be a direction parallel to the longitudinal axis. The radial direction is understood to be a direction perpendicular to the longitudinal axis away from the longitudinal axis or towards the longitudinal axis. The circumferential direction is understood to be a direction perpendicular to the longitudinal axis that circles the longitudinal axis without changing the distance to the longitudinal axis.

Furthermore, the present invention relates to a metering pump for conveying a fluid, comprising a displacement element and a metering chamber, wherein the displacement element delimits the metering chamber and is movable back and forth between a pressure position and a suction position, wherein a volume of the metering chamber in the pressure position of the displacement element is smaller than a volume of the metering chamber in the suction position of the displacement element, wherein a drive unit of the type mentioned above is provided, with which a drive force is applied to the displacement element during operation of the metering pump.

BACKGROUND

In the case of rotating components such as a drive shaft in a motor metering pump, sufficient lubrication is essential to ensure proper functioning of the drive unit in which the rotating components are installed and to reduce wear and increase service life, respectively. Furthermore, insufficiently lubricated components harbor the risk that friction will generate heat and sparks, which represent a source of ignition that should not be underestimated, especially when processing explosive substances.

Various solutions for supplying lubricant to various components are already known from the prior art. Typically, the lubricant supply to a drive shaft in a drive unit of the type mentioned above is achieved by filling the drive chamber with a lubricant. As a rule, however, the lubricant can only be filled into the drive chamber up to a certain level. Otherwise, there is an increased risk of lubricant escaping from the drive chamber and contaminating neighboring areas. This is particularly undesirable in applications in medical technology or the food industry, where metering pumps are frequently used. In addition, raising the level of the lubricant leads to an increased demand and associated increased costs for the lubricant supply to the drive shaft.

However, limiting the filling level to a certain level in order to avoid the above-mentioned disadvantages in turn leads to the disadvantage that a bearing of the drive shaft, which is arranged above the filling level, is no longer sufficiently supplied with lubricant. As a result, friction and wear increase, and the function of the drive unit is impaired.

It is therefore also known from the prior art to provide additional, external lubricant supply devices that actively deliver the lubricant from a reservoir to the required point of use. However, these supply devices also have disadvantages due to the additional costs for provision and operation. Manual relubrication of the drive shaft is also considered disadvantageous due to the effort involved. Alternatively, lubricant supply systems are also known which convey a lubricant above a certain lubricant level due to centrifugal forces acting during the rotation of a drive shaft. For this purpose, drive shafts known from the prior art have, for example, a closed delivery channel in their interior in which the fluid is transported. However, the formation of such an internal conveying channel is very costly to manufacture. In addition, the conveying channel must be cleaned regularly to remove any buildup of lubricant.

Finally, special lifetime lubrication systems, such as grease-filled, sealed rolling bearings, are also known to ensure adequate lubrication of the mounted components over their entire service life. This solution is also associated with high costs and, in particular, it is difficult to maintain a level of ignition protection.

SUMMARY

The problem solved by the present invention is therefore to provide a drive unit of the type mentioned at the beginning, which allows sufficient, cost-effective lubrication of components arranged above the filling level of a lubricant.

The problem underlying the invention is solved by a drive unit of the type mentioned at the beginning, wherein the conveying channel is formed as a recess in a lateral surface of the drive shaft.

The drive unit according to the invention provides for lubricant to be transported above the filling level. This is not, as in the case of external lubricant supply devices known in the prior art, a unit which transports the lubricant above the filling level independently, for example as a result of pumping force, but rather a passive conveying process which is brought about by the rotation of the drive shaft.

Due to the arrangement of a conveying channel in the drive shaft, which extends from a first point below the filling level to a second point above the filling level, lubricant enters the conveying channel at the first point below the filling level. If the drive shaft is set in rotation during operation of the drive unit, the lubricant moves to the second point above the filling level due to the centrifugal forces acting, so that areas of the drive shaft above the filling level can also be supplied with lubricant. The lubricant is thus supplied solely on the basis of the rotary motion of the drive shaft, which it performs anyway during operation of the drive unit.

Moreover, the lubricant is not conveyed in a closed conveying channel, but the conveying channel is only formed as a recess in the outer surface of the drive shaft. A closed conveying channel is understood to be a conveying channel which is completely bounded in its circumferential direction by a channel wall. Applied to the present invention, this means that the conveying channel in the drive unit according to the invention is not completely enclosed by a channel wall in its circumferential direction, but is open towards the lateral surface.

The drive unit according to the invention thus provides a lubricant supply for areas outside a filling level of a lubricant by means of a simple, mechanical design of the drive shaft. There is no need to raise the filling level or to provide complex, external lubricant supplies or lubricant channels inside the drive shaft, so that the lower quantity of lubricant required and the simple manufacturing process save costs and ensure the function of the drive unit over a long period. In particular, despite the smaller quantity of lubricant required, any requirements for a level of ignition protection are maintained, since sufficient lubrication is ensured at all times.

In particular, a lateral surface of the drive shaft in one embodiment is understood to be a surface which encloses an angle of less than 90°, preferably less than 70°, with the longitudinal axis.

In one embodiment, the conveying channel has a first boundary wall which delimits at least a section of the conveying channel in the radial direction. This forms a kind of vane or, viewed in radial direction to the longitudinal axis, an undercut in the drive shaft, which serves to convey the lubricant.

The conveying channel may comprise a channel guide wall extending along the longitudinal axis or a channel guide wall inclined with respect to the longitudinal axis, and the first and a second boundary wall, wherein the first and the second boundary walls extend along the longitudinal axis and do not lie in a plane with the channel guide wall.

Preferably, the two boundary walls are parallel or substantially parallel to each other to ensure that no lubricant can splash out beyond the lateral surface. The boundary walls result in the lubricant being guided more effectively in the conveying channel.

In particular, in one embodiment, the drive shaft has a conveying section and a bearing section arranged in the direction of the longitudinal axis adjacent to the conveying section and above the filling level, the conveying section projecting at least in sections in a radial direction with respect to the longitudinal axis beyond the bearing section so that the conveying section has an upper surface and a lateral surface, wherein the upper surface forms an end of the conveying section facing the bearing section and is arranged above the filling level, wherein the conveying channel has an opening in the upper surface and an opening in the lateral surface, wherein the conveying section is configured such that, when the drive shaft is rotated in the direction of rotation, lubricant enters the conveying channel via the opening in the lateral surface and exits the conveying channel via the opening in the upper surface. In this way, the bearing section located above the filling level is effectively supplied with lubricant and the friction of the drive shaft in the area of the bearing section is reduced.

In a further embodiment of this embodiment, the channel guide wall is inclined by a maximum of 85° relative to the longitudinal axis, the inclination being such that when the drive shaft rotates in the direction of rotation, lubricant is lifted by the channel guide wall above the filling level. The inclination of the channel guide wall results in improved conveyance of the lubricant above the filling level due to the centrifugal forces acting.

In particular, in one embodiment, the channel guide wall is delimited by the upper surface. The lubricant thus exits directly at the upper surface and can form a lubricant film on the upper surface due to the rotational movement of the drive shaft. Corresponding surfaces of the bearing can, for example, run off on this upper surface, enclosing the bearing section.

In one embodiment, a first connecting section extending along the longitudinal axis is provided between the channel guide wall and the lateral boundary walls, wherein the first connecting section is curved with a radius of curvature, wherein preferably the lateral boundary walls are delimited by the lateral surface, and between the lateral boundary walls and the lateral surface a second connecting section is provided, which is curved with a radius of curvature. In other words, there is no sharp edge between the channel guide wall and the lateral boundary walls in which lubricant residues could settle and lead to clogging of the conveying channel over time.

In another embodiment, the channel guide wall comprises at least two portions which enclose a different angle with the longitudinal axis, wherein preferably a portion of the channel guide wall spaced from the upper surface encloses a larger angle with the longitudinal axis than a portion of the channel guide wall adjacent to the upper surface. The portion spaced from the upper surface could also be considered the bottom surface of the conveying channel, which initially facilitates receiving the lubricant into the conveying channel, while the other portion adjacent to the upper surface is primarily for conveying the lubricant.

In a further embodiment, the channel guide wall is convexly curved at least in sections. Convex at this point is defined from the cavity of the conveying channel. In other words, the conveying channel is also convexly curved when the channel guide wall is convexly curved. The convex curvature, just like the curved connecting section to the lateral boundary walls, means that there are no sharp edges that can become clogged with lubricant.

In particular, in one embodiment, the conveying section is cylindrical.

In a further embodiment, the drive shaft comprises two or more conveying channels, wherein a number N of conveying channels is preferably arranged around the longitudinal axis such that the drive shaft has an N-fold rotational symmetry. In this way, the lubricant can be transported uniformly to an area above the filling level and sufficient lubrication can be ensured.

In another embodiment, the second point is arranged at most 50 mm above the filling level to ensure that the centrifugal forces are sufficient to transport sufficient lubricant above the filling level.

In a further embodiment, the bearing comprises a lower boundary surface arranged at an angle to the longitudinal axis, wherein the conveying channel ends at the lower boundary surface. The lubricant thus exits directly in a region in which the drive shaft comes into contact with a boundary surface of the bearing, i.e. in a region in which a correspondingly high friction is to be expected. A lower boundary surface of the bearing can, for example, also be understood to mean rolling elements that are arranged in a rolling element cage of the bearing and come into contact with the upper surface of the conveying section when the rolling elements roll on the upper surface.

Further, in one embodiment, the drive shaft comprises an actuating member engaged with an eccentric for converting a rotational movement of the drive shaft into a translational movement, wherein the drive shaft further comprises a conveying section, wherein the conveying section is arranged along the longitudinal axis above the actuating member, wherein the conveying section comprises the conveying channel.

Furthermore, the problem underlying the invention is also solved by a metering pump of the type mentioned at the beginning, wherein a drive unit according to one of the embodiments described above is used.

Further advantages, features and possible applications of the present invention will become clear from the following description of an embodiment and the accompanying figures. Identical components are described by the same reference signs.

DETAILED DESCRIPTION

Figure 1:
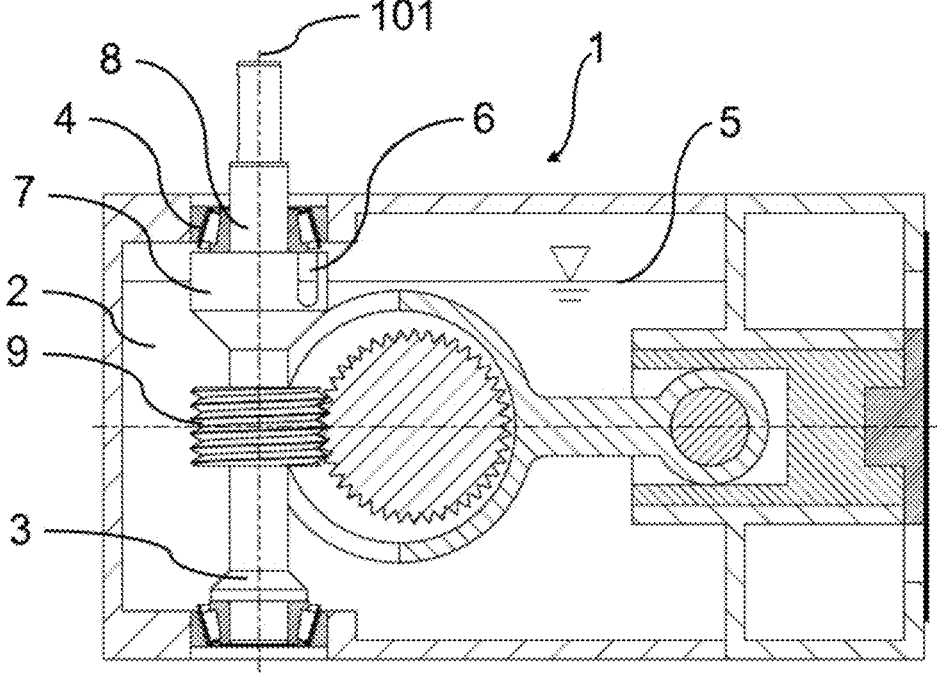
FIG. 1 shows a schematic representation of an embodiment of the drive unit according to the invention.
Figure 2:
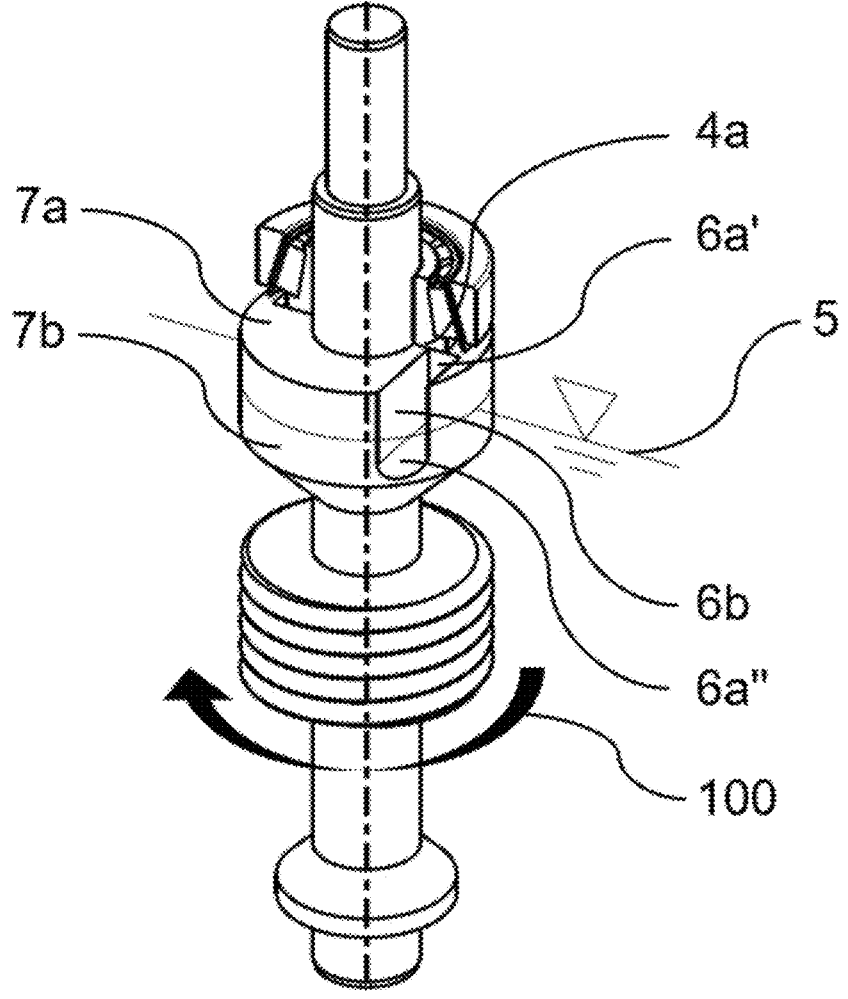
FIG. 2 shows a three-dimensional schematic representation of the drive shaft of the embodiment shown in FIG. 1.
Figure 4:
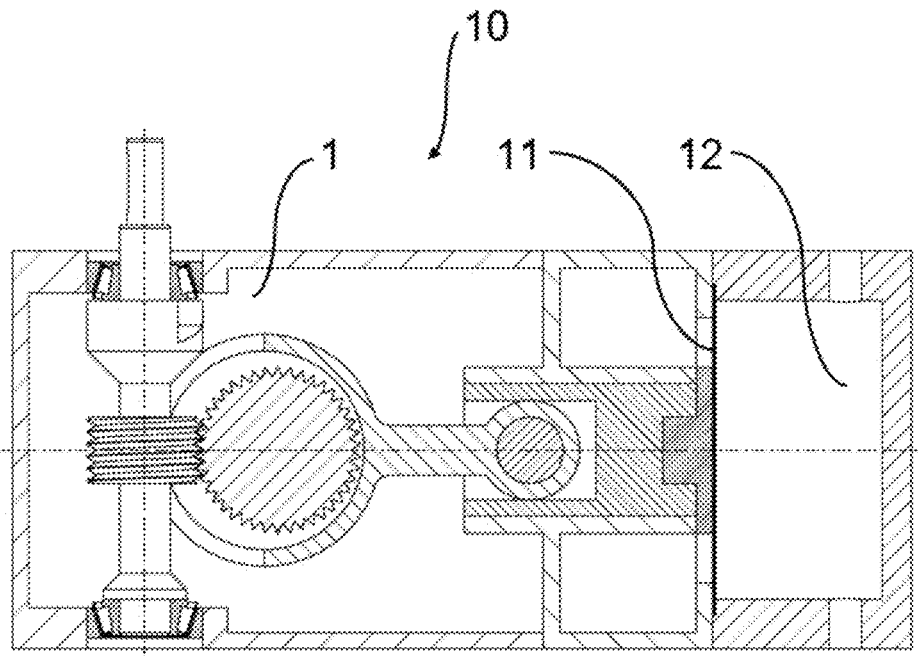
FIG. 4 shows a schematic representation of a metering pump with the drive unit according to the invention.

The drive unit 1 shown in FIGS. 1, 2 and 4 has a drive chamber 2 in which a bearing section 8 of the drive shaft 3 is supported in a bearing 4. The drive shaft 3 extends along a longitudinal axis 101 and is rotated about the longitudinal axis 101 in a direction of rotation 100 during operation of the drive unit 1.

The drive chamber 2 is filled with a lubricant up to a filling level 5 for lubricating the drive shaft 3. In order to also supply the bearing 4, which is arranged above the filling level 5, with lubricant, the drive shaft 3 has a conveying section 7 with a conveying channel 6 which extends from a first point below the filling level 5 to a second point above the filling level 5.

The arrangement of the conveying channel 6 in the conveying section 7 according to the embodiment shown in FIGS. 1, 2 and 4 becomes particularly clear from FIG. 2. Due to the arrangement of an opening of the conveying channel 6 in the lateral surface 7b of the conveying section 7, which extends into an area below the filling level 5, lubricant can enter into the conveying channel 6. Due to the rotation of the drive shaft 3 in the direction of rotation 100 and the centrifugal forces acting therewith, the lubricant is conveyed to an opening of the conveying channel 6 in an upper surface 7a of the conveying section 7, which is located above the filling level 5.

The lubricant thus exits in an area of the drive shaft 3 where the bearing section 8 and the conveying section 7 are in contact with the bearing 4. In particular, there is contact between the upper surface 7a of the conveying section and a lower boundary surface 4a of the bearing 4. These contact surfaces, which are formed by rolling elements of the bearing 4 and are subject to a high level of friction during rotation of the drive shaft 3, are thus sufficiently supplied with lubricant without the need to raise the filling level 5. Further lubricant supply to other bearing components, such as the rolling element cage in which the rolling elements are held, is then ensured via the rolling elements which are supplied with the lubricant.

Various options are available for the design of the conveying channel 6. The conveying channel 6 of the embodiment shown in FIGS. 1, 2 and 4 has a channel guide wall 6a comprising two portions 6a', 6a", wherein a portion 6a' adjacent to the upper surface 7a of the conveying section 7 extends along the longitudinal axis 101, while a portion 6a" spaced from the upper surface 7a encloses an angle with the longitudinal axis 101. Further, the portion 6a" spaced from the upper surface 7a is convex, thus curving outwardly into the conveying section 7 as viewed from the conveying channel 6.

Further, the conveying channel 6 is delimited in the radial direction by two boundary walls 6b, which connect at an angle to the portions 6a', 6a" of the channel guide wall 6a.

Figures 3A, 3B:
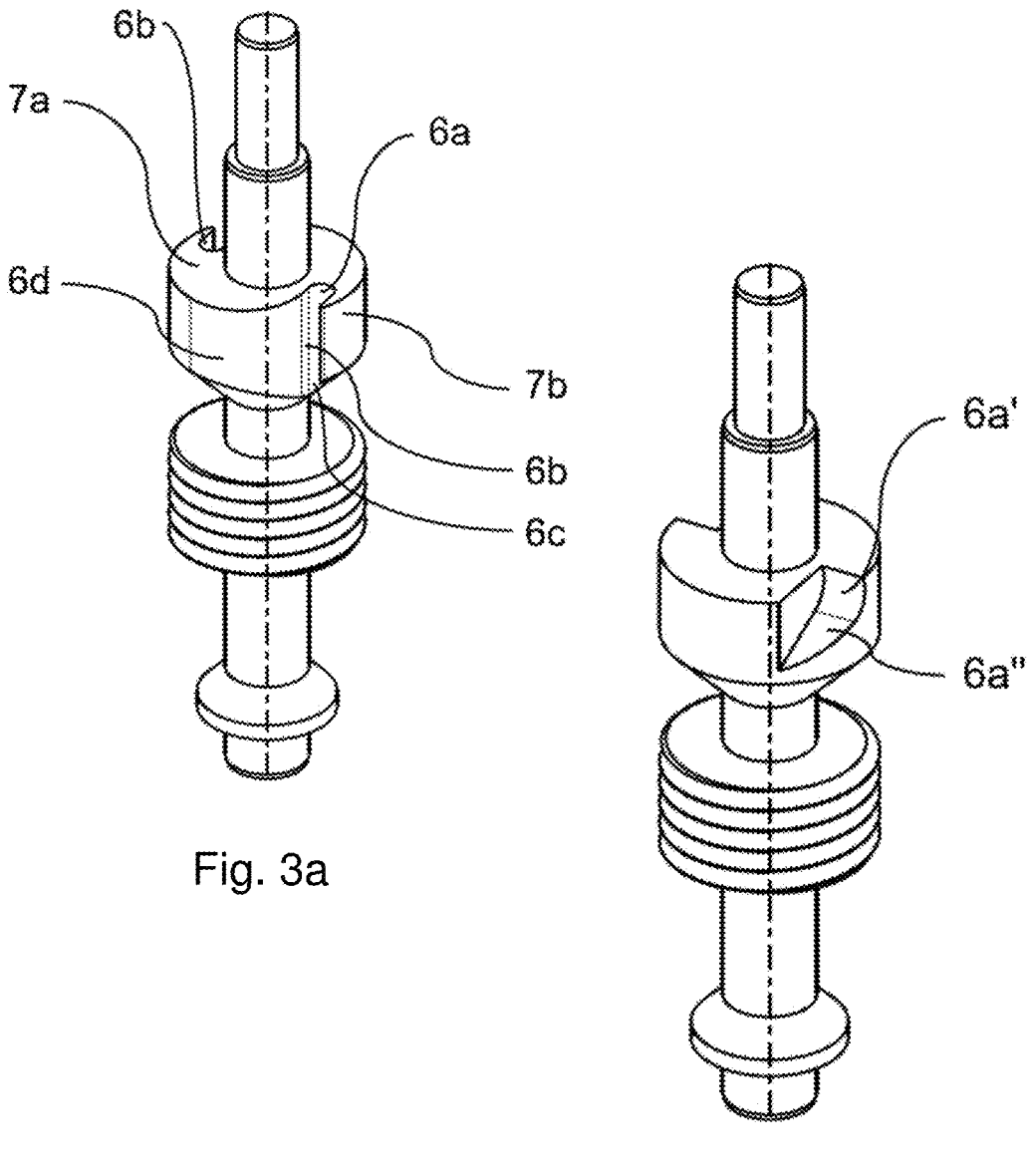
FIG. 3a shows a drive shaft of a further embodiment of the drive unit according to the invention.
FIG. 3b shows a drive shaft of a further embodiment of the drive unit according to the invention.

FIGS. 3a and 3b show alternative embodiments for the design of the conveying channel 6. In the embodiment shown in FIG. 3a, the conveying channel 6 has a channel guide wall 6a that extends along the longitudinal axis 101 and is connected to the boundary walls 6b via a first curved connecting section 6c. The boundary walls 6b in turn merge with the lateral surface 7b of the conveying section 7 via a second curved connecting section 6d.

In contrast, the conveying channel 6 shown in FIG. 3b has only one lateral boundary wall 6b, whereas the channel guide wall 6a consists of two portions 6a' and 6a" which are inclined with respect to the longitudinal axis 101 and wherein the portion 6a" spaced from the upper surface 7a forms a larger angle with the longitudinal axis 101 than the portion 6a' adjacent to the upper surface 7a, which is additionally convex, i.e. curves into the body of the conveying section 7 as viewed from the conveying channel 6.

The conveying section 7 of the drive shaft 3 shown in FIGS. 3a and 3b each has two conveying channels 6 arranged rotationally symmetrically with respect to the longitudinal axis 101.

FIG. 4 illustrates the mode of operation of the drive unit 1 according to the invention in a metering pump 10. The drive unit 1 moves a displacement element 11 back and forth between a pressure position and a suction position, whereby a fluid to be conveyed is sucked into a metering chamber 12 or pressed out again. For this purpose, the rotational movement of the drive shaft 3 is converted into a translational movement via an actuating member 9 and an eccentric, which moves the displacement element 11 back and forth along a movement axis.

Despite the economical supply of lubricant to the bearing 4 by the design of the drive unit 1 according to the invention, the metering pump 10 can be used in areas where, for example, explosive substances are used. Due to the continuous supply of lubricant to the bearing 4 in accordance with the invention, there is no risk of lubricants leaking out or of the bearing 4 not being sufficiently lubricated, resulting in increased friction and heat generation. Any requirements for a level of ignition protection can thus be met despite lower lubricant use. This not only saves costs for lubricants, but also increases the service life of the metering pump 10.

LIST OF REFERENCES

1 Drive unit
2 Drive chamber
3 Drive shaft
4 Bearing
4a Lower boundary surface of the bearing
5 Filling level
6 Conveying channel
6a Channel guide wall
6a', 6a" Sections of the channel guide wall
6b Lateral boundary wall
6c First connecting section
6d Second connecting section 7 Conveying section
7a Upper surface
7b Lateral surface
8 Bearing section
9 Actuating member
10 Metering pump
11 Displacement element
12 Metering chamber
100 Direction of rotation
101 Longitudinal axis

The invention claimed is:

1. A drive unit for a motor metering pump, comprising:
a drive chamber;
a drive shaft arranged in the drive chamber, wherein the drive shaft is rotated in a direction of rotation about a longitudinal axis during operation of the drive unit;
a bearing in which the drive shaft is mounted, wherein the drive chamber is filled with a lubricant up to a filling level during the operation of the drive unit, wherein the bearing is arranged above the filling level in the direction of rotation about the longitudinal axis, wherein the drive shaft comprises:
a conveying channel for the lubricant which extends from a first point below the filling level to a second point above the filling level and is arranged such that during the operation of the drive unit lubricant is transported from the first point to the second point, wherein the conveying channel is formed as a recess in a lateral surface of the drive shaft, the conveying channel has a first boundary wall which delimits the conveying channel in an outward radial direction perpendicular to the longitudinal axis such that an undercut is formed, the conveying channel comprises the first boundary wall, a channel guide wall and a secondary boundary wall, both the first boundary wall and the second boundary wall extend along the longitudinal axis and do not lie in a plane with the channel guide wall, and the conveying channel is configured to inhibit radial escape of the lubricant within the recess by virtue of undercut geometry during rotation of the drive shaft.

2. The drive unit according to claim 1, wherein the drive shaft has a conveying section and a bearing section arranged in the direction of the longitudinal axis next to the conveying section and above the filling level, the conveying section projecting at least in sections in a radial direction with respect to the longitudinal axis beyond the bearing section, so that the conveying section has an upper surface above the lateral surface, wherein the upper surface forms an end of the conveying section facing the bearing section and is arranged above the filling level, wherein the conveying channel has an opening in the upper surface and an opening in the lateral surface, wherein the conveying section is configured such that when the drive shaft rotates in the direction of rotation, lubricant enters the conveying channel via the opening in the lateral surface and exits the conveying channel via the opening in the upper surface.

3. The drive unit according to claim 2, wherein the conveying section is cylindrical.

4. The drive unit according to claim 1, wherein the channel guide wall is inclined relative to the longitudinal axis by a maximum of 85°, the inclination being such that, when the drive shaft is rotated in the direction of rotation, lubricant is lifted from the channel guide wall above the filling level.

5. The drive unit according to claim 4, wherein the channel guide wall is delimited by the upper surface.

6. The drive unit according to claim 1, wherein a first connecting section extending along the longitudinal axis is provided between the channel guide wall and the first and second boundary walls, the first connecting section is curved with a radius of curvature, and the first and second boundary walls are delimited by the lateral surface.

7. The drive unit of claim 6, wherein a second connecting portion is provided which is curved with the radius of curvature between the first and second boundary walls.

8. The drive unit according to claim 1, wherein the channel guide wall comprises at least two portions which
a first portion encloses a first angle with the longitudinal axis and
a second portion encloses a second angle with the longitudinal axis.

9. The drive unit of claim 8, wherein the second portion is spaced from the upper surface and encloses a larger angle with the longitudinal axis than the first portion adjacent to the upper surface.

10. The drive unit according to claim 1, wherein the channel guide wall is convexly curved at least in sections.

11. The drive unit according to claim 1, wherein the drive shaft comprises two or more conveying channels.

12. The drive unit of claim 11, wherein a number N of conveying channels is arranged around the longitudinal axis such that the drive shaft has an N-fold rotational symmetry.

13. The drive unit according to claim 1, wherein the second point is arranged at most 50 mm above the filling level.

14. The drive unit according to claim 1, wherein the bearing comprises
a lower boundary surface arranged at an angle to the longitudinal axis, wherein the conveying channel ends at the lower boundary surface.

15. The drive unit according to claim 1, wherein the drive shaft comprises
an actuating member engaged with an eccentric for converting a rotational movement of the drive shaft into a translational movement, wherein the drive shaft further comprises
a conveying section, wherein the conveying section is arranged along the longitudinal axis above the actuating member, wherein the conveying section comprises the conveying channel.

16. A metering pump for conveying a fluid, comprising
a displacement element and
a metering chamber, wherein the displacement element delimits the metering chamber and is movable back and forth between a pressure position and a suction position, wherein a volume of the metering chamber in the pressure position of the displacement element is smaller than a volume of the metering chamber in the suction position of the displacement element, wherein the drive unit according to claim 15 is provided, with which a drive force is applied to the displacement element during operation of the metering pump.

17. The drive unit of claim 1, wherein the channel guide wall extends along the longitudinal axis.

18. The drive unit of claim 1, wherein the channel guide wall is inclined with respect to the longitudinal axis.

* * * * *